United States Patent Office 3,280,996
Patented Oct. 25, 1966

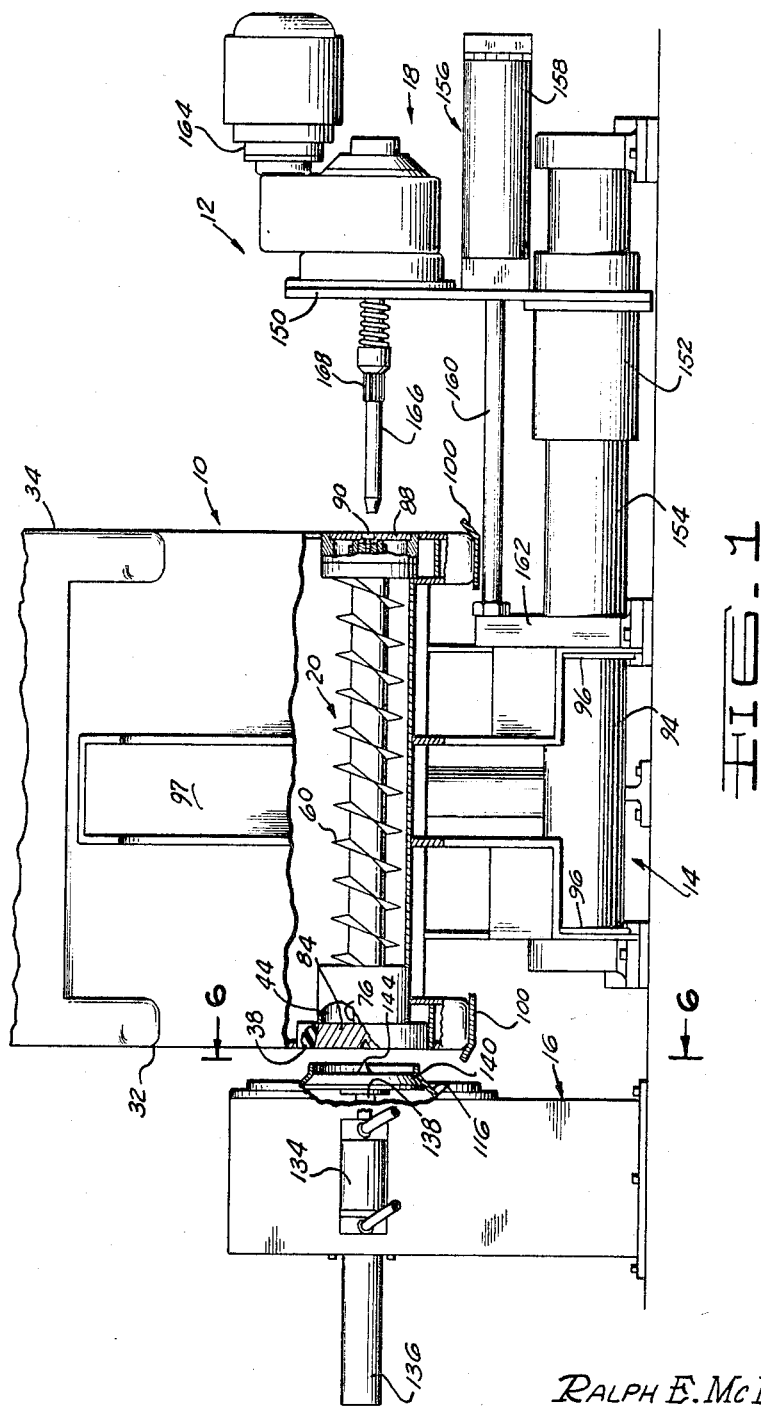

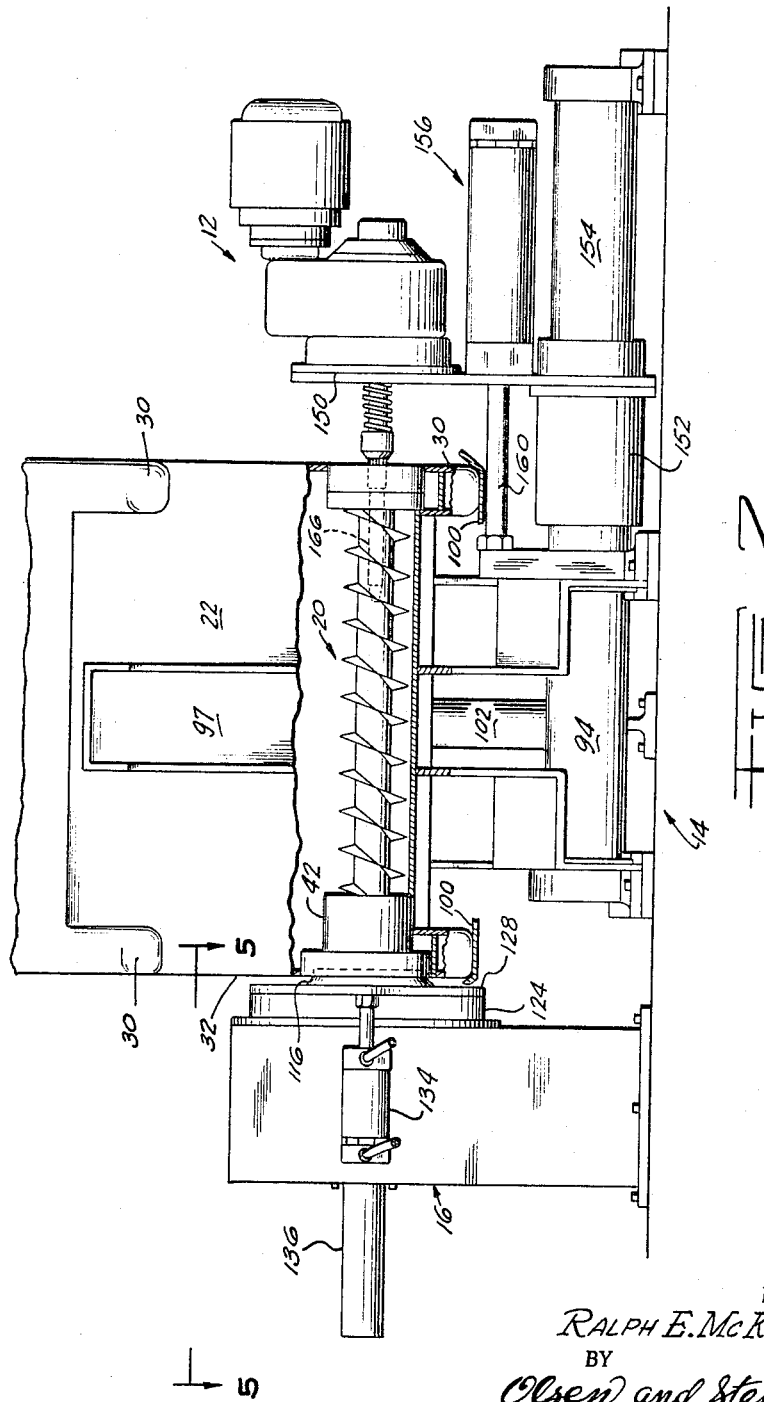

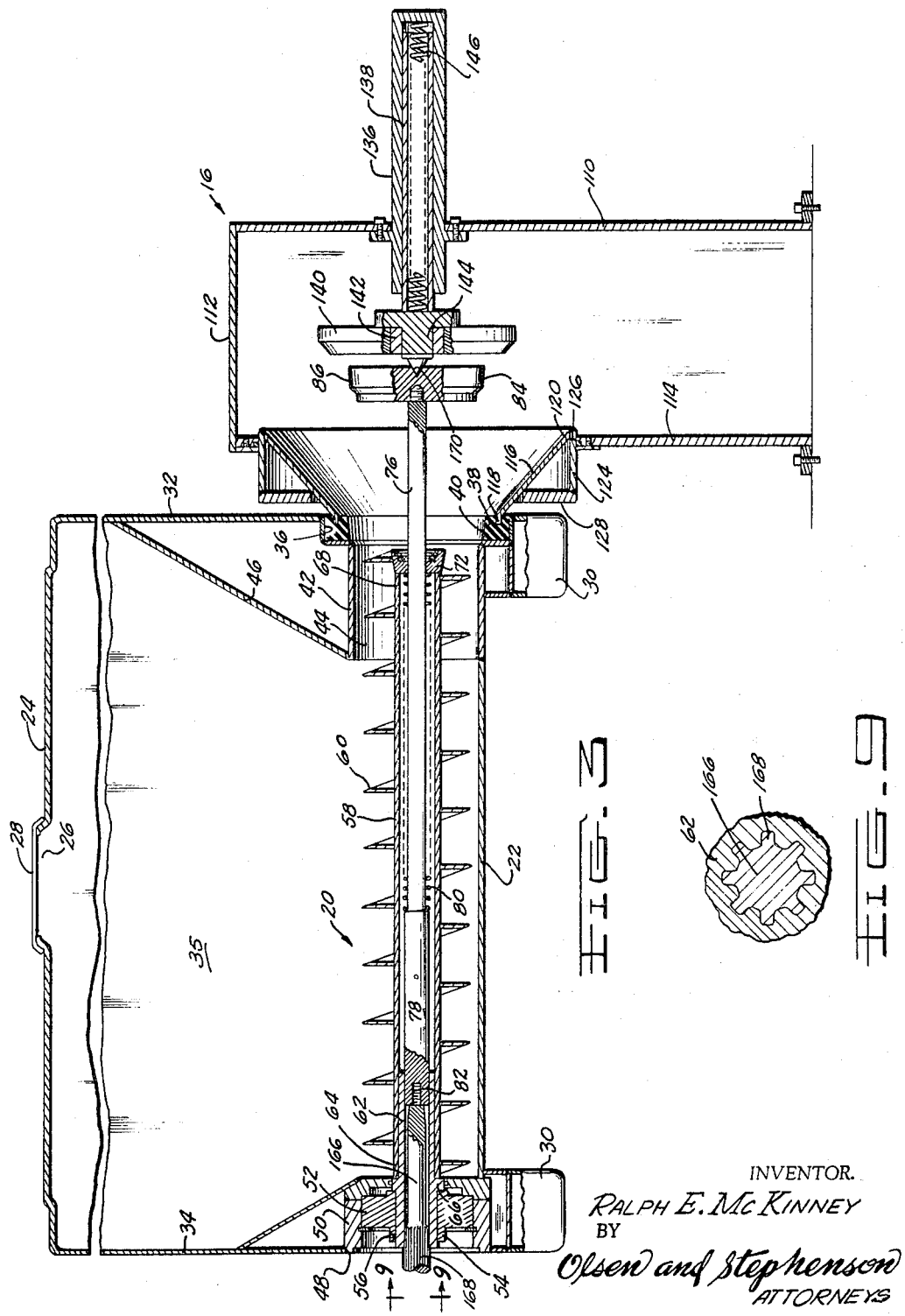

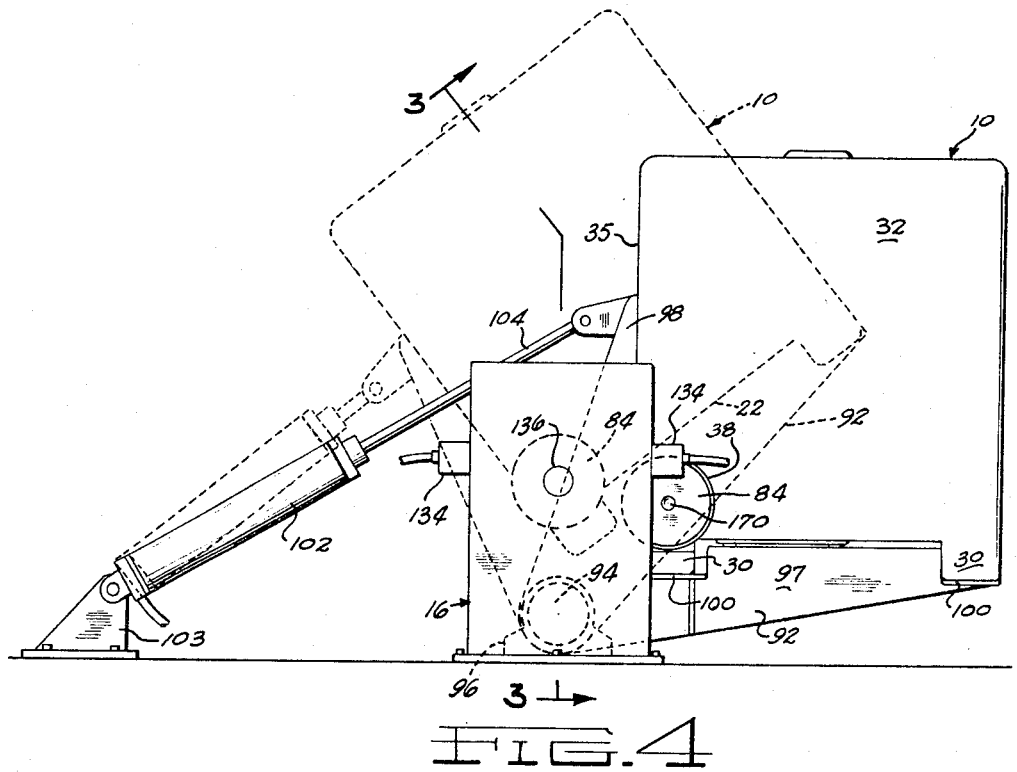
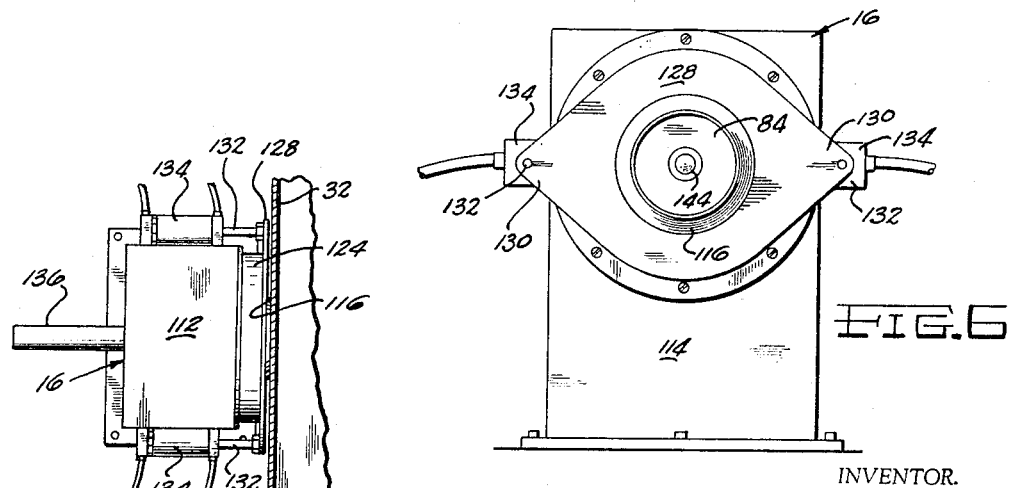

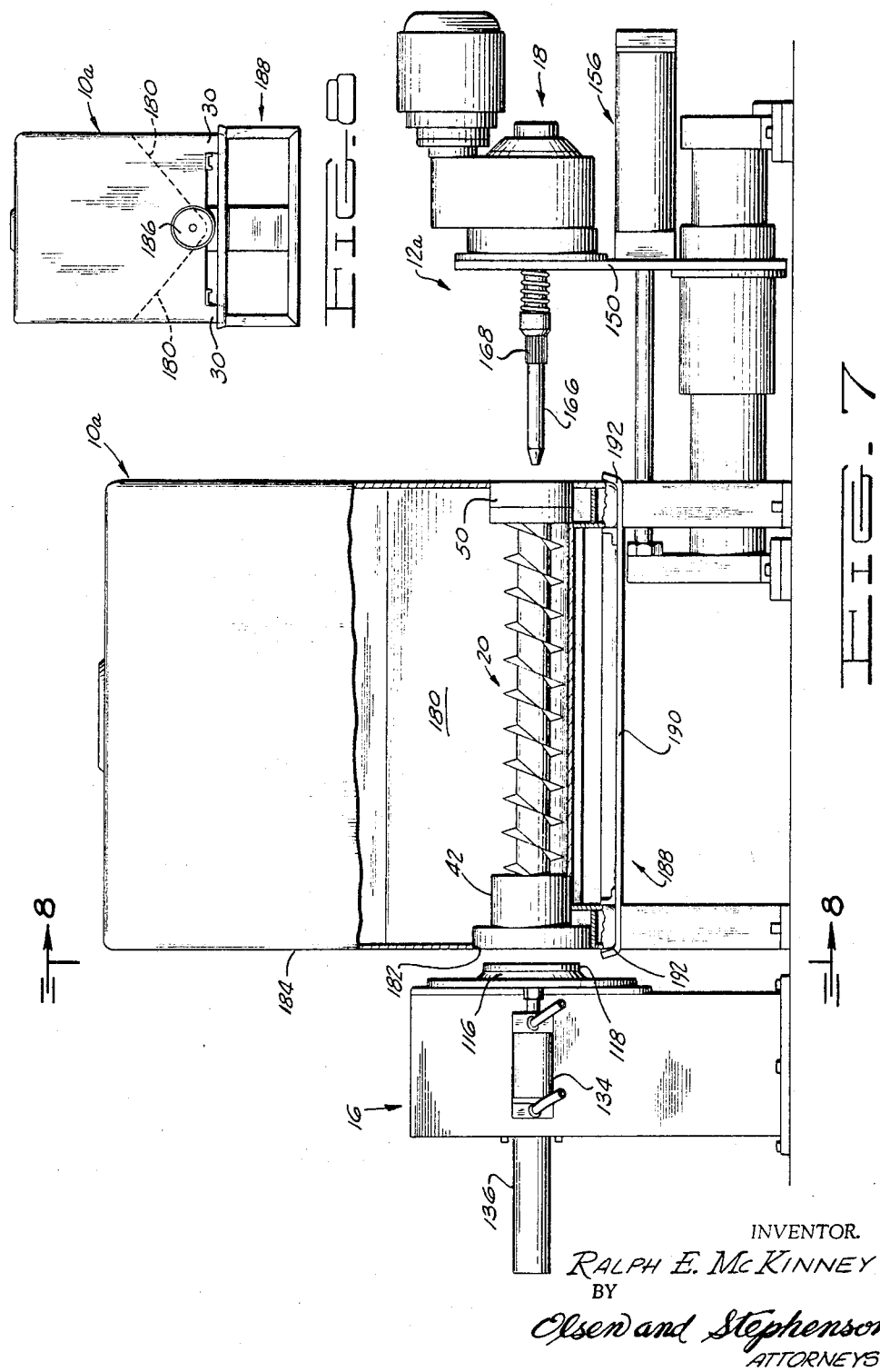

3,280,996
BINS AND APPARATUS FOR DISCHARGING BINS
Ralph E. McKinney, Beatrice, Nebr., assignor to Hoover Ball and Bearing Company, Saline, Mich., a corporation of Michigan
Filed May 13, 1964, Ser. No. 367,129
19 Claims. (Cl. 214—302)

This invention relates generally to bins for transporting and storing bulk material, and apparatus for discharging material from such bins, and more particularly to an improved bin which includes a conveyor as a part thereof, and improved apparatus for discharging such a bin.

Relatively large metal bins have proven to be advantageous for transporting, storing and otherwise handling bulk material, both in-plant and between plants. However, most bin systems of this type presently being used do not have any entirely satisfactory provision for unloading part of a bin and thereafter sealing the bin, and do not have any provision for metering the material discharged from the bin directly into the product line. It is an object of this invention, therefore, to provide an improved bin, which can either partially or fully discharged as desired, and which includes a screw conveyor assembly, the delivery rate of which may be adjusted for metering the discharge of material out of the bin; and an improved discharge station which is operable to align the bin with a discharge housing which receives material from the bin and a drive shaft which is operable to drive the screw conveyor in the bin.

A further object of this invention is to provide a bin having a screw conveyor assembly which is readily removed from the bin for cleaning both the bin and the conveyor assembly.

A further object of this invention is to provide a bin and a discharge station therefor in which a screw conveyor assembly in the bin is drivingly supported at one end and is supported at the opposite end on a discharge opening cover for the bin, and in which a discharge housing for receiving material discharge from the bin has a rotatable spindle for supporting the cover, to thus support the screw conveyor during discharge of material from the bin.

Still a further object of this invention is to provide a rectangular bin having a normally horizontal bottom wall and a screw conveyor which extends transversely of the bin at one lower corner thereof, so that when the bin is tipped, one side wall and the bottom wall function as inclined hopper walls to direct the contents of the bin into the screw conveyor.

Another object of this invention is to provide a bin with hopper walls which direct material in the bin to a screw conveyor which extends along the bottom of the bin for discharging material through one side of the bin.

Yet another object of this invention is to provide a housing unit for receiving material discharged from the bin of this invention which, when it is not receiving material from the bin, is in a dust tight closed condition.

Further objects, features and advantages of this invention will become apparent from a consideration of the following description, the appended claims, and the accompanying drawing in which:

FIGURE 1 is a side elevational view of a bin of this invention, having some parts broken away for the purpose of clarity, showing the bin in a tipped position in assembly relation with the discharge station apparatus of this invention, and illustrating the bin in a position in which it is about to be discharged;

FIGURE 2 is a side elevational view of the bin and discharge station apparatus of this invention, illustrated similarly to FIG. 1, showing the elements of the discharge station apparatus in position for discharging the contents of the bin;

FIGURE 3 is a sectional view of the bin of this invention and the discharge housing in the discharge station apparatus of this invention, showing the elements thereof in position for discharging the contents of the bin, and looking substantially along the line 3—3 in FIG. 4;

FIGURE 4 is an elevational view of one end of the discharge station apparatus of this invention, showing the bin of this invention mounted thereon, showing the bin in an initially mounted position on the discharge station apparatus in solid lines and showing the bin in a position tipped for discharge in broken lines;

FIGURE 5 is a fragmentary detail view of the apparatus of this invention looking substantially along the line 5—5 in FIG. 2;

FIGURE 6 is an elevational view of the discharge housing in the discharge station apparatus of this invention, looking substantially along the line 6—6 in FIG. 1;

FIGURE 7 is a side elevational view of a modified form of the bin of this invention shown in assembly relation with a modified form of the discharge station apparatus of this invention adapted particularly for the modified bin shown in FIG. 7;

FIGURE 8 is a reduced size end view of the modified bin shown in FIG. 7, showing the bin mounted on the discharge station apparatus shown in FIG. 7, and looking substantially along the line 8—8 in FIG. 7; and FIGURE 9 is an enlarged fragmentary detail sectional view looking substantially along the line 9—9 in FIG. 3.

With reference to the drawing, the bin of this invention, indicated generally at 10, is illustrated in FIG. 1 in assembly relation with discharge station apparatus, indicated generally at 12, which consists of a tipping mechanism 14 on which the bin 10 is supported, a housing unit 16, which receives material discharged from the bin 10, and a drive unit 18, which is operable to drive a screw conveyor assembly 20 in the bin 10 so as to discharge material from the bin 10 into the housing unit 16. As shown in FIGS. 1, 3 and 4, the bin 10 is of a generally rectangular shape in cross section, having a flat bottom wall 22, a top wall 24 formed with an inlet opening 26 provided with a removable cover 28, and supporting legs 30 which extend downwardly from the bottom wall 22 in a floor supported position of the bin 10. The bin also has a front wall 32, a rear wall 34 which is spaced horizontally from the front wall 32 and side walls 35.

A discharge opening 36 is formed in the front wall 32 in one lower corner thereof, and an annular sealing gasket 38 is positioned in the opening 36. The gasket 38 is formed of a resilient yieldable material such as rubber and has a tapered surface 40 on its radially inner side for a purpose to appear presently. A curved plate 42 secured to the front wall 32 so as to extend inwardly of the bin 10 cooperates with the bin bottom wall 22 to form a chamber 44 which extends horizontally and communicates at its outer end with the discharge opening 36 and at its inner end with the interior of the bin 10. A baffle plate 46 extends upwardly from the inner end of the plate 42 and is secured to the front wall 32 at a position above the discharge opening 36 for guiding material in the bin 10 toward the inlet end of the chamber 44.

The bin back wall 34 is also formed with an opening 48 which is substantially horizontally aligned with the discharge opening 36. A bearing housing 50, secured to the back wall 34 at the opening 48 extends inwardly of the bin 10 toward the chamber 44 and supports an annular bearing 52 which is likewise substantially horizontally aligned with the discharge opening 36. The bearing 52 has an annular flange 54 which extends toward the back wall opening 48 and carries set screws 56 which are accessible from outside the bin 10 through the opening 48 for a purpose to appear presently.

The screw conveyor assembly 20 is of a size such that it can be assembled with the bin 10 by inserting it endwise through the discharge opening 36 with the gasket 38 mounted therein. The assembly 20 consists of an elongated tubular shaft 58 having a radially outwardly extending screw thread 60 secured to the outer side thereof. An internally splined drive member 62 is secured to and extends axially outwardly from the rear end 64 of the shaft 58. In mounting the screw conveyor assembly 20 on the bin 10, the drive member 62 is inserted through the bearing 52 to a stop position in which a shoulder 66 on the drive member 62 engages the bearing 52, following which the set screws 56 are rotated into locking engagement with the drive member 62.

The front end 68 of the shaft 58 has an annular seal 72 secured thereto so that the seal 72 forms a part of shaft 58. The rod 76 which is telescopically supported within the shaft 52 has an enlarged rear end portion 78, and a spring 80 is positioned about the rod 76 so that it extends between the seal 72 and the enlarged portion 78 so as to continually apply a force to the rod 76 urging it in a direction axially inwardly of the shaft 58. The rear end of the shaft 76 is formed with a tapped opening 82 for a purpose to appear presently. The front end of the rod 76 is connected to a circular cover 84 which is of a size to close the discharge opening 36, having a tapered edge 86 shaped to sealingly engage the tapered seal surface 40.

It can thus be seen that the shaft 58 for the screw conveyor assembly 20 is rotatably supported at its rear end on the bearing 52. When the cover 84 is in a position sealingly engaging the gasket 38 so as to close the bin discharge opening 36, the front end 68 of the shaft 58 is supported by the cover 84 which is in turn supported on bin 10. In this position of the cover 84, the bin rear wall opening 48 is closed by a removable plate 88 (FIG. 1) which is retained in place by a screw 90 threaded into the tapped opening 82 in the rod 76.

The contents of the bin 10 are discharged through the discharge opening 36 by first moving the cover 84 horizontally away from the gasket 38, to a position such as shown in FIG. 3, followed by driving of the driving member 62 so as to rotate the screw thread 60 in a direction so as to first move material from the interior of the bin into the chamber 44 and thence out the outlet opening 36. This is accomplished by first moving the bin 10, by means of a fork lift truck or the like engaged with the bin bottom wall 22 between the legs 30, to a supported position on the bin tipping mechanism 14. The mechanism 14 (FIGS. 1, 2 and 4) consists of a bin supporting frame 92 mounted on a horizontal shaft 94 which is rotatably supported by spaced stationary bearings 96.

The frame 92 includes a pair of angularly related legs 97 and 98 which are positioned, as shown in solid lines in FIG. 4, for receiving the bin 10 so that the leg 97 is substantially horizontal and the leg 98 is substantially vertical. The bin 10 is moved to a supported position on the leg 97 in which the bin legs 30 are supported on supporting portions 100 of the leg 97 and in which one of the bin side walls 35 engages the leg 98. A cylinder assembly 102, pivotally mounted on a stationary support 103 and having its piston rod 104 connected to the upper end of the leg 98, is then retracted so as to rotate the bin supporting frame 92 to its tipped position shown in broken lines in FIG. 3 so as to tip the bin 10 through an angle of about 45°. In the tipped position of the bin 10, shown in broken lines in FIG. 3, the bin bottom wall 22 and the bin side wall 35 which is in engagement with the tipping frame leg 98, are inclined so that they converge in a downward direction toward the screw conveyor assembly 20 and thus act like hopper walls to direct material in the bin 10 toward the screw conveyor 20. This tipped position of the bin 10 shown in FIGS. 1 2 and 4 is hereinafter referred to as the discharge position of the bin 10.

The discharge housing unit 16 (FIG. 3) has a rear wall 110, a top wall 112, and a front wall 114 and is constructed so that it is substantially dust tight. A generally frusto-conical chute member 116 is provided for funneling material from the bin into the interior of the housing unit 16. The chute member 116 has a reduced diameter inlet end formed by a flange 118 and a larger diameter outlet end 120 which is secured to a tubular supporting frame 124 slidably supported in an opening 126 in the housing unit front wall 114. A plate 128 secured to the front end of the frame 124 has side projections 130 which are secured to the piston rods 132 for a pair of fluid actuated cylinder assemblies 134 secured to opposite sides of the housing unit 16. On operation of the cylinder assemblies 134 to extend the piston rods 132, the chute member 116 is extended out of the housing unit 16, and on retraction of the piston rods 132, the chute member 116 is retracted into the housing unit 16.

An elongated cylindrical guide member 136 is secured to the housing unit back wall 110 and functions as a guide for an elongated tubular spindle support 138. The spindle support 138 is secured at its front end to a closure member 140 which carries an annular bearing 142 in which a spindle member 144 is rotatably supported. The closure member 140 is of a shape to sealingly engage the chute member 116, as shown in FIG. 1, and is positioned so that it is in substantially horizontal alignment with the inlet end 118 of the chute 116. A spring 146 positioned within the tubular spindle support 138 so that it extends between the end wall of the guide 136 and the closure member 140, continually exerts a force on the closure member 140 and the spindle 144 urging these members toward a bin 10 mounted on tipping mechanism 14. Consequently, when the chute member 116 is retracted, and there are no forces on the spindle 144 tending to contract the spring 146, spring 146 maintains the closure member 140 in sealing engagement with the chute member 116 as shown in FIG. 1. As a result, when housing unit 16 has its components in the positions shown in FIG. 1 it is substantially dust tight.

The driving unit 18 for the discharge station 12 consists of an upright frame plate 150 mounted at its lower end on a tubular bearing 152 which is slidably supported on a stationary substantially horizontal shaft 154. A fluid actuated cylinder assembly 156 has its cylinder 158 mounted on the plate 150 and has its piston rod 160 secured to a stationary support 162 for shaft 154. Consequently, on retraction of the piston rod 160 into the cylinder 158, the supporting plate 150 is moved toward the bin 10, and on extension of the piston rod 160 out of the cylinder 158, the supporting plate 150 is moved away from the bin 10.

A motor unit 164 mounted on the plate 150 drives a drive shaft 166 which is substantially horizontal and extends toward the bin 10. Spline teeth 168 formed on the drive shaft 166 are of a size to mesh with the internal splines on the driving member 62 for the screw conveyor assembly 20 when the drive shaft 166 is inserted within the driving member 62 to the extent shown in FIGS. 2 and 3.

In the discharge position of the bin 10 shown in FIGS. 1–3, the drive shaft 166 is aligned with the driving member 62 and the spindle 144 and chute 116 are aligned with the bin discharge opening 36. As shown in FIG. 1, when the bin is initially moved to its discharge position, by the tipping apparatus 14 the drive shaft 166 is positioned on one side of the bin 10 in a spaced relation with the bin rear wall 34 and the chute member 116 is arranged in a spaced relation with the bin front wall 32. The cylinder assemblies 134 are first actuated to extend the chute member 116 out of the housing unit 16 to a position in which the inlet flange 118 of the chute member 116 engages and extends into the outer side of the resilient gasket 38 so as to provide an air tight seal therebetween. This forward movement of the chute member 116 also allows the spring 146 to move the spindle 144 into engagement with the bin cover 84 at a cavity 170 formed in the center of the cover 84 and shaped to receive the pointed end of the spindle 144. The plate 88 is removed from the bin rear wall 34, by first removing screw 90, and the cylinder assembly 156 is actuated to move the supporting plate 150 toward the bin 10 to a position in which the drive shaft 166 extends into the driving member 62 as shown in FIG. 1. As shown in FIG. 3, when the drive shaft 166 enters the driving member 62, it moves the cover actuating rod 76 axially outwardly of the conveyor shaft 58 against the pressures of the springs 80 and 146, and moves the closure member 140 inwardly of housing unit 14 away from chute member 116. During such movement of cover 84, the end 68 of the conveyor shaft 58 is supported on the spindle 144. The drive shaft 166 is moved into the driving member 62 a distance sufficient to position the spline teeth on these members in driving engagement as shown in FIG. 9.

When the cover 84 has been moved a sufficient distance away from the bin 10 to fully open the discharge opening 36, as shown in FIG. 3, the motor 164 is operated to rotate the drive shaft 166 which in turn drives the driving member 62 for the screw conveyor assembly 20. Limit switches (not shown) are installed on the discharge station apparatus 12 to insure an automatic cycling of the apparatus through the above sequence.

As the driving member 62 is rotated, the screw thread 60 is rotated to move material from the interior of the bin 10 into the chamber 44 and out of the chamber 44 through the discharge opening 36. The thread 60 can be rotated at a speed and for a time period necessary to provide the desired rate and extent of discharge of material from the bin 10. Material discharged from the discharge opening 36 travels through the chute member 116 into the housing unit 16 to the desired point of use. To discontinue the discharge of material from the bin 10, it is only necessary to stop the motor 164.

Because the chamber 44 is of a length at least equal to the axial length of two flights of screw thread 60, and is only slightly larger in cross section than the diameter of thread 60, the front end of thread 60 effectively blocks the opening 36 so that material in the bin cannot flow therethrough when the screw thread 60 is not rotating. Consequently, the bin 10 can be removed from the discharge station apparatus 12 in a partially emptied condition, without danger of material in the bin leaking out of the discharge opening 36 between the time rotation of shaft 58 is discontinued and the time cover 84 is returned to its position closing opening 36. In order to effect such a removal, the cylinder assembly 156 is first actuated to withdraw the drive shaft 166 to the position shown in FIG. 1, thereby providing for return movement of the cover 84 into sealing engagement with the gasket 38 by the pressure of the springs 80 and 146. The cylinder assemblies 134 are then actuated to retract the chute member 116 to its position within the housing unit 16 as shown in FIG. 1. The cylinder rod 104 is then extended to return the tipping apparatus 14 to its solid line position shown in FIG. 4 so that the bin 10 can be removed therefrom.

A modified form of the bin of this invention is indicated at 10a in FIG. 8. The bin 10a is identical to the bin 10 in many respects so like numerals are used on bin 10a to indicate like parts on bin 10 and only the differences between bin 10a and bin 10 will be described in detail. The bin 10a is provided with internal baffle or hopper plates 180 which converge in a downward direction toward the bottom of the bin. Adjacent the juncture of the hopper plates 180 the bin 10a is provided with the screw conveyor assembly 20 which communicates with a discharge opening 182 which is located in the bin front wall 184 at a position slightly above the lower ends of the hopper plates 180. A cover 186 cooperates with conveyor assembly 20 and is operable like the cover 84 to close the discharge opening 182.

A modified form of the discharge station apparatus of this invention indicated generally at 12a in FIG. 7 is operable to discharge the bin 10a. The apparatus 12a is identical to the apparatus 12 previously described except that the tipping apparatus 14 in the apparatus 12 is replaced in the apparatus 12a by a stationary stand 188. Since the bin 10a includes the hopper plates 180 which can, if desired, constitute the bottom wall of the bin, which direct material in the bin to the screw conveyor assembly 20 when the bin is in its normal upright position, it is not necessary to tip the bin 10a, as is the case with the bin 10, in order to discharge the bin 10a. Consequently, the stand 188 consists of a stationary frame 190 having bin leg receiving sections 192 positioned relative to the drive apparatus 18 and the housing unit 16 such that when the bin legs 30 are supported on the frame sections 192, the drive shaft 166 is aligned with the screw conveyor driving member 62 and the bin discharge opening 182 is aligned with the inlet end 118 of the chute 116. As a result, when the bin 10a is mounted on the discharge stand 188 it can be unloaded in exactly the same way that the bin 10 was unloaded, as described in detail above. In all respects other than those described above, the bin 10a is identical to the bin 10 and the apparatus 12a is identical to the apparatus 12.

From the above description it is seen that this invention provides improved bins 10 and 10a each of which includes the screw conveyor assembly 20 which is arranged so that a bin can be partially unloaded and resealed without danger of leakage of material from the bin. By virtue of the inclusion of the housing 44 in a bin, the screw thread 60 is effective to hold the back pressure caused by the head of material in the bin, thereby allowing the bin cover 84 or 186 to be snapped back into a sealed closed position when the bin has only been partially emptied. The circular shape of the covers 84 and 186 on a similarly shaped gasket provides for an improved seal of the bin at the discharge door both when the bin is in transit and at the point of discharge. The discharge housing 16 can be arranged so that material flows therefrom directly into a product line and by virtue of the screw thread discharge of material from the bin 10 or 10a, metered amounts of material can be discharged directly from the bin into the product line without the need for auxiliary equipment. Because the screw conveyor assembly 20 is of a size such that it can be removed through the gasket 38, the bin and the conveyor 20 can be readily cleaned by loosening the set screws 56 and withdrawing the conveyor assembly 20 from the bin through the gasket 38.

It will be understood that the bins and apparatus for discharging bins which are herein disclosed and described are presented for purposes of explanation and illustration and are not intended to indicate limits of the invention, the scope of which is defined by the following claims.

What is claimed is:

1. A portable bin comprising a rectangular top, a rectangular bottom of substantially the same size as said top, a front wall, and side walls, a discharge opening in said front wall located in one corner thereof adjacent said bottom, a single screw conveyor assembly positioned entirely within said bin in substantial alignment with said opening and extending transversely of said bin adjacent said bottom, said screw conveyor being located adjacent the juncture of one of said side walls and said bottom so that said bin can be tipped to a position in which said one side wall and said bottom will direct material in said bin to said screw conveyor, said bin having a second opening located in a side wall opposite said front wall and substantially aligned with said conveyor, and drive means for said conveyor communicating with said second opening.

2. A portable bin comprising a rectangular bottom wall and a pair of horizontally spaced wall portions, extending upwardly from said bottom wall, a substantially horizontal screw conveyor assembly located entirely within said bin adjacent one edge of said bottom wall and having a pair of ends one of which is supported on said bin adjacent one of said wall portions, the other one of said wall portions having a bin discharge opening therein positioned adjacent the opposite end of said conveyor assembly, a cover for said discharge opening supporting the opposite end of said conveyor assembly, a drive member for said conveyor assembly located at said one end thereof, and said one wall portion having an opening therein communicating with said drive member, said bin having a side wall extending between said wall portions located so that said bin can be tipped to a position in which said side wall and said bottom wall will direct material in said bin to said screw conveyor.

3. In a bin having a side discharge opening, a screw conveyor assembly comprising an elongated tubular shaft, a screw thread extending radially outwardly from and secured to said shaft, bearing means on said bin supporting one end of said shaft, said bin having a discharge opening therein disposed adjacent the opposite end of said shaft, a cover removably supported on said bin so as to close said opening, a cover actuating rod telescopically supported on said shaft and secured to said cover, and means for moving said rod in a direction axially of said shaft so as to move said cover out of a supported position on said bin and away from said discharge opening.

4. In a bin having a side discharge opening, a screw conveyor assembly comprising an elongated tubular shaft, a screw thread extending radially outwardly from and secured to said shaft, bearing means on said bin supporting one end of said shaft, an internally splined drive member for said assembly secured to said one end of said shaft, said bin having a discharge opening therein disposed adjacent the opposite end of said shaft, a cover removably supported on said bin so as to close said opening, a cover actuating rod telescopically supported within said shaft and secured to said cover, and means for moving said rod in a direction axially of said shaft so as to move said cover out of a supported position on said bin and away from said discharge opening.

5. In a bin according to claim 4 in which spring means disposed in said shaft urges said rod to a position in which said cover closes said discharge opening.

6. In combination with a bin having a pair of spaced wall portions and a discharge opening in one of said wall portions, annular bearing means disposed in the other one of said wall portions in a position in substantial alignment with said discharge opening, said bearing means having an annular flange on the outer side thereof accessible from outside said bin, a screw conveyor assembly comprising a tubular shaft, a screw thread secured to and extending radially outwardly from said shaft, an internally splined drive member secured to and extending axially outwardly from one end of said shaft, said conveyor assembly being insertable into said bin through said discharge opening to a position in which said drive member is supported in said bearing means and said flange thereon, means on said flange for releasably connecting said flange to said drive member, a cover adapted to be supported on said bin so as to close said opening, and a cover actuating rod telescopically supported in said shaft and secured to said cover, said rod being movable axially outwardly of said shaft to move said cover away from and into a spaced relation with said discharge opening.

7. In a bin having a pair of horizontally spaced wall portions adjacent the lower end thereof and a discharge opening in one of said wall portions, means forming a horizontally extending chamber in said bin adjacent the lower end thereof, said chamber communicating at one end with the interior of said bin and terminating at the opposite end at said discharge opening, a screw conveyor assembly comprising an elongated tubular shaft, a screw thread secured to and extending radially outwardy of said shaft, said shaft having one end portion thereof disposed in said chamber and having the opposite end portion thereof supported on the other one of said wall portions, a cover adapted to be supported on said bin so as to close said discharge opening, and a cover actuating rod secured to said cover and telescopically supported in said shaft, said rod being movable axially of said shaft to move said cover away from said discharge opening.

8. In a bin according to claim 7 in which said chamber is of a length in a direction axially of said shaft equal to at least the length of two flights on said screw thread so that the flights of said screw thread disposed in said chamber will block the flow of material out of said bin when said thread is not being rotated.

9. In a bin according to claim 7 in which an annular resilient gasket is supported on said bin in said discharge opening, and said cover is of a shape to be supported in and sealingly engage said gasket in a position of said cover closing said discharge opening.

10. In a bin for transporting and storing granular materials and having a lower end and a top through which said bin is filled, a pair of horizontally spaced wall portions one of which has a discharge opening therein through which material is removed from the bin, a screw conveyor assembly comprising a tubular shaft having a pair of end portions, a screw thread mounted on and extending radially outwardly from said shaft, an internally splined drive member secured to one end portion of said shaft in a substantially coaxial relation therewith, means supporting said one shaft end portion on the other one of said wall portions so that said drive member extends therethrough, a cover adapted to be supported on said bin so as to close said discharge opening, a cover actuating rod secured to said cover and supported telescopically within the opposite end portion of said shaft, and an externally splined drive shaft extendible into said drive member into a driving relation therewith for rotating said tubular shaft, said drive shaft when in a driving relation with said drive member extending into said tubular shaft into engagement with said cover actuating rod so as to move said rod axially outwardly of said tubular shaft a distance sufficient to move said cover member out of a supported position on said bin and into a position spaced from said discharge opening.

11. In a bin for transporting and storing granular materials and having a lower end and a top through which said bin is filled, a pair of horizontally spaced wall portions one of which has a discharge opening therein through which said material is removed from the bin, a screw conveyor assembly comprising a tubular shaft having a pair of end portions, a screw thread mounted on and extending radially outwardly from said shaft, an internally splined drive member secured to one end portion of said shaft in a substantially coaxial relation therewith, means supporting said one shaft end portion on the other one of said wall portions so that said drive member extends therethrough, a cover adapted to be supported on said bin so as to close said discharge opening, a cover actuating rod secured to said cover and supported telescopically within the opposite end portion of said shaft, an externally splined drive shaft extendible into said drive member into a driving relation therewith for rotating said tubular shaft, said drive shaft when in a driving relation with said drive member extending into said tubular shaft into engagement with said cover actuating rod so as to move said rod axially outwardly of said tubular shaft a distance sufficient to move said cover member out of a supported position on said bin and into a position spaced from said discharge opening, a housing for receiving material discharged from said bin through said discharge opening, said housing having an inlet opening located to receive material discharged from said discharge opening, and a rotatable spindle in said housing positioned in a supporting relation with said cover so as to rotatably support said opposite end portion of said tubular shaft during rotation thereof.

12. In combination with a bin having a pair of horizontally spaced wall portions one of which is formed with a bin discharge opening, a screw conveyor assembly supported on said bin and positioned to discharge material therefrom through said discharge opening, a driving member for said conveyor assembly positioned in the other one of said wall portions, a discharge station for said bin comprising bin support means supporting said bin in a predetermined discharge position, a housing for receiving material discharged from said bin and located on one side of said supporting means in a spaced relation with said bin, said housing having extensible and retractible chute means thereon movable toward said bin into engagement therewith, a drive shaft located on the opposite side of said bin supporting means, and means for moving said drive shaft toward said bin into driving engagement with said driving member thereon, said bin in said predetermined position being located so that said discharge opening is substantially horizontally aligned with said chute means and said driving member is substantially horizontally aligned with said drive shaft.

13. In combination with a generally rectangular bin having a bottom wall, horizontally spaced front and rear walls and side walls extending between said front and rear walls, said front wall having a bin discharge opening formed in one lower corner thereof adjacent the juncture of said front wall with said bottom wall and one of said side walls, a screw conveyor assembly supported on said bin and positioned to discharge material therefrom through said discharge opening, a driving member for said conveyor assembly positioned in said rear wall in substantial alignment with said discharge opening, a discharge station for said bin comprising pivotally mounted bin support means adapted to tip said bin to a predetermined discharge position in which said bin bottom and one side wall incline downwardly toward said conveyor assembly, a housing for receiving material discharged from said bin and located on one side of said supporting means in a spaced relation with said bin, said housing having extensible and retractible chute means thereon movable toward said bin into engagement therewith, a drive shaft located on the opposite side of said bin supporting means, and means for moving said drive shaft toward said bin into driving engagement with said driving member thereon, said bin in said predetermined discharge position being located so that said discharge opening is substantially horizontally aligned with said chute means and said driving member is substantially horizontally aligned with said drive shaft.

14. A bin for transporting and storing granular materials, said bin having a bottom wall, spaced front and rear walls and side walls which extend between said front and rear walls, said front wall having a discharge opening therein located in one lower corner thereof adjacent the juncture of said front wall with one side wall and said bottom wall, a screw conveyor assembly comprising a tubular shaft having a pair of end portions, a screw thread mounted on and extending radially outwardly from said shaft, a drive member secured to one end portion of said shaft in a substantially coaxial relation therewith, means supporting said one shaft end portion on said rear wall so that said drive member is accessible through said rear wall, a cover adapted to be supported on said bin so as to close said discharge opening, and a cover actuating rod secured to said cover and supported telescopically within the opposite end portion of said shaft, said cover actuating rod being movable axially outwardly of said tubular shaft a distance sufficient to move said cover out of a supported position on said bin and into a position spaced from said discharge opening.

15. In a bin for transporting and storing granular materials, said bin having a pair of downwardly converging hopper walls and a pair of horizontally spaced wall portions extending between opposite ends of said hopper walls adjacent the lower ends thereof, one of said wall portions having a discharge opening therein through which said material is removed from the bin, a screw conveyor assembly comprising a tubular shaft having a pair of end portions, a screw thread mounted on and extending radially outwardly from said shaft, an internally splined drive member secured to one end portion of said shaft in a substantially coaxial relation therewith, means supporting said one shaft end portion on the other one of said wall portions so that said drive member extends therethrough, a cover adapted to be supported on said bin so as to close said discharge opening, a cover actuating rod secured to said cover and supported telescopically within the opposite end portion of said shaft, said cover actuating rod being movable axially outwardly of said tubular shaft a distance sufficient to move said cover out of a supported position on said bin and into a position spaced from said discharge opening.

16. In combination, a bin having a pair of horizontally spaced wall portions one of which has a discharge opening formed therein, a resilient annual gasket mounted on said bin in said opening, bearing means mounted on said bin and located in the other one of said wall portions in substantially horizontal alignment with said opening, a hollow screw conveyor having a pair of ends one of which is rotatably supported on said bearing means and the other of which is located adjacent said opening, a cover sealingly supported in said gasket, a cover actuating rod secured to said cover and extended into said conveyor through said other end thereof in a supporting relation with said other end, said rod being movable axially of said screw conveyor to move said cover away from said opening, a housing positioned adjacent said discharge opening for receiving material discharged therefrom, a rotatable spindle supported in said housing in substantially horizontal alignment with said cover so that it supportingly engages said cover on movement of said cover into said housing, means supporting said spindle for sliding movement in a direction away from said bin as said cover is moved into said housing, and spring means urging said spindle toward said cover.

17. In combination, a bin having a pair of horizontally spaced wall portions one of which has a discharge opening formed therein, bearing means mounted on said bin and located in the other one of said wall portions in substantially horizontal alignment with said opening, a hollow screw conveyor having a pair of ends one of which is rotatably supported on said bearing means and the other of which is located adjacent said opening, a cover supported on said bin so as to close said opening, a cover actuating rod secured to said cover and extended into said conveyor through said other end thereof in a supporting relation with said other end, said rod being movable axially of said screw conveyor to move said cover away from said opening, a housing positioned ajacent said discharge opening for receiving material discharged therefrom, and means in said housing in substantially horizontal alignment with said cover supporting said cover on movement of said cover into said housing, said cover supporting means being mounted on said housing for sliding movement in a direction away from said bin as said cover is moved into said housing.

18. A housing unit for receiving granular material discharged from a bin, said housing unit comprising a hollow body having side walls and an opening in one of said side walls, a hollow open ended chute member slidably supported on said one side wall in said opening, said chute member having an inner end which communicates with the interior of said body and an outer inlet end which projects out of said body, extensible and retractible means mounted on said body and connected to said chute member for moving said chute member outwardly and inwardly relative to said body, a rotatable spindle mounted on said body in substantial alignment with said chute inlet end, means slidingly supporting said spindle for movement toward and away from said inlet end of said chute member, and means urging said spindle toward the inlet end of said chute member.

19. A housing unit for receiving granular material discharged from a bin, said housing unit comprising a hollow body having side walls and an opening in one of said side walls, a frusto-conical open ended chute member slidably supported on said one side wall in said opening, said chute member having a discharge end which communicates with the interior of said body and a smaller diameter inlet end which projects out of said body, extensible and retractible means mounted on said body and connected to said chute member for moving said chute member outwardly and inwardly relative to said body, a closure for said chute member mounted on said body in substantial alignment with said chute inlet end, said closure being of a generally circular shape and being of a diameter smaller than the discharge end and larger than the inlet end of said chute member for sealingly engaging the inner surface of the chute member intermediate the ends thereof, means slidingly supporting said closure for movement toward and away from said inlet end of said chute member, and spring means urging said closure toward the inlet end of said chute member.

References Cited by the Examiner

UNITED STATES PATENTS

| | | | |
|---|---|---|---|
| 993,294 | 5/1911 | Edison | 214—17 |
| 1,912,742 | 6/1933 | Van Law | 214—302 |
| 2,014,617 | 9/1935 | Fischer. | |
| 2,554,796 | 5/1951 | Runninger | 214—17 |
| 2,699,272 | 1/1955 | Barth | 222—413 |
| 2,884,146 | 4/1959 | Jalkanen | 214—17 |
| 3,005,561 | 10/1961 | Zoller | 214—303 |
| 3,088,637 | 5/1963 | Stone | 222—413 |
| 3,137,402 | 6/1964 | Gunn | 214—314 |
| 3,151,749 | 10/1964 | Long | 214—17 |

MARVIN A. CHAMPION, *Primary Examiner.*

GERALD M. FORLENZA, ROBERT G. SHERIDAN,
*Examiners.*